S. ROBINSON.
CHAIN WELDING MACHINE.
APPLICATION FILED JAN. 29, 1919.

1,362,897.

Patented Dec. 21, 1920.
3 SHEETS—SHEET 1.

INVENTOR.
Samuel Robinson
BY
W. W. Williamson
ATTORNEY.

S. ROBINSON.
CHAIN WELDING MACHINE.
APPLICATION FILED JAN. 29, 1919.
1,362,897.
Patented Dec. 21, 1920.
3 SHEETS—SHEET 2.
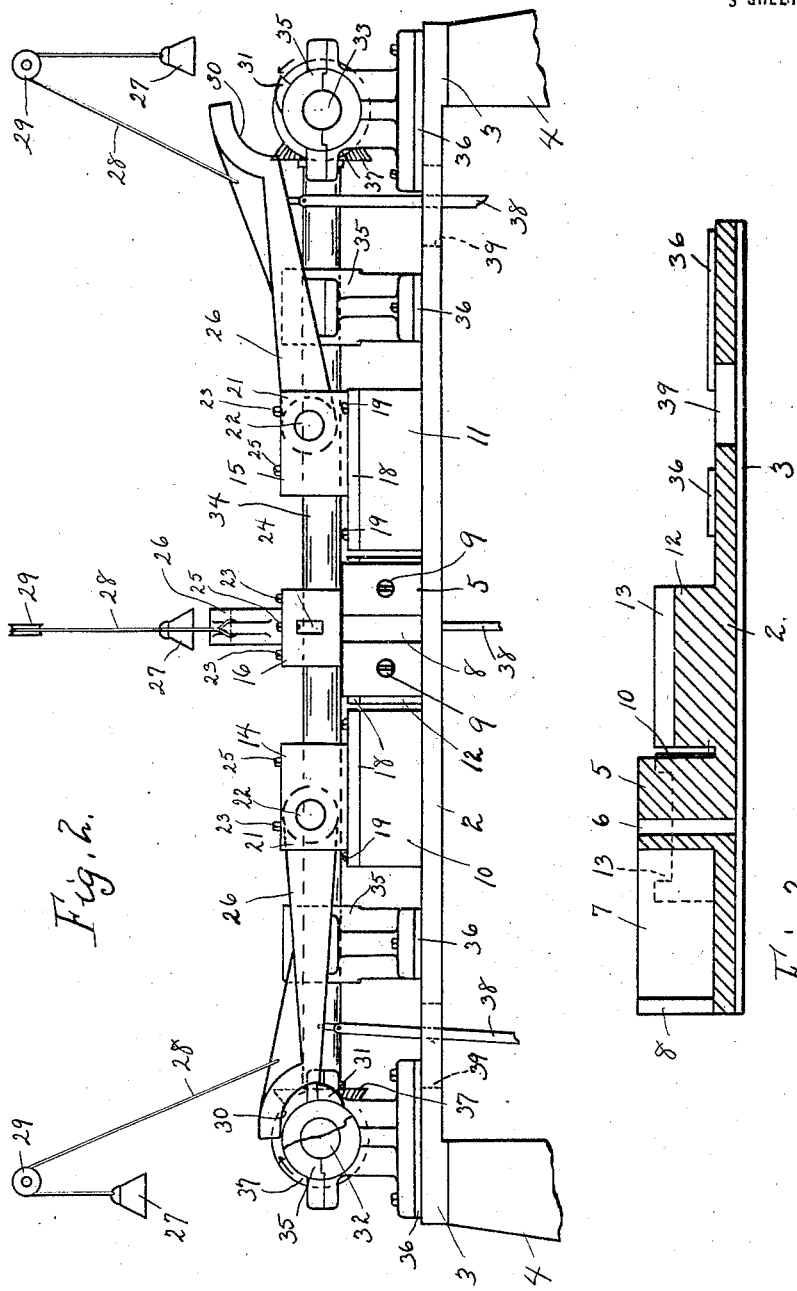
INVENTOR.
Samuel Robinson
BY
W. W. Williamson
ATTORNEY.

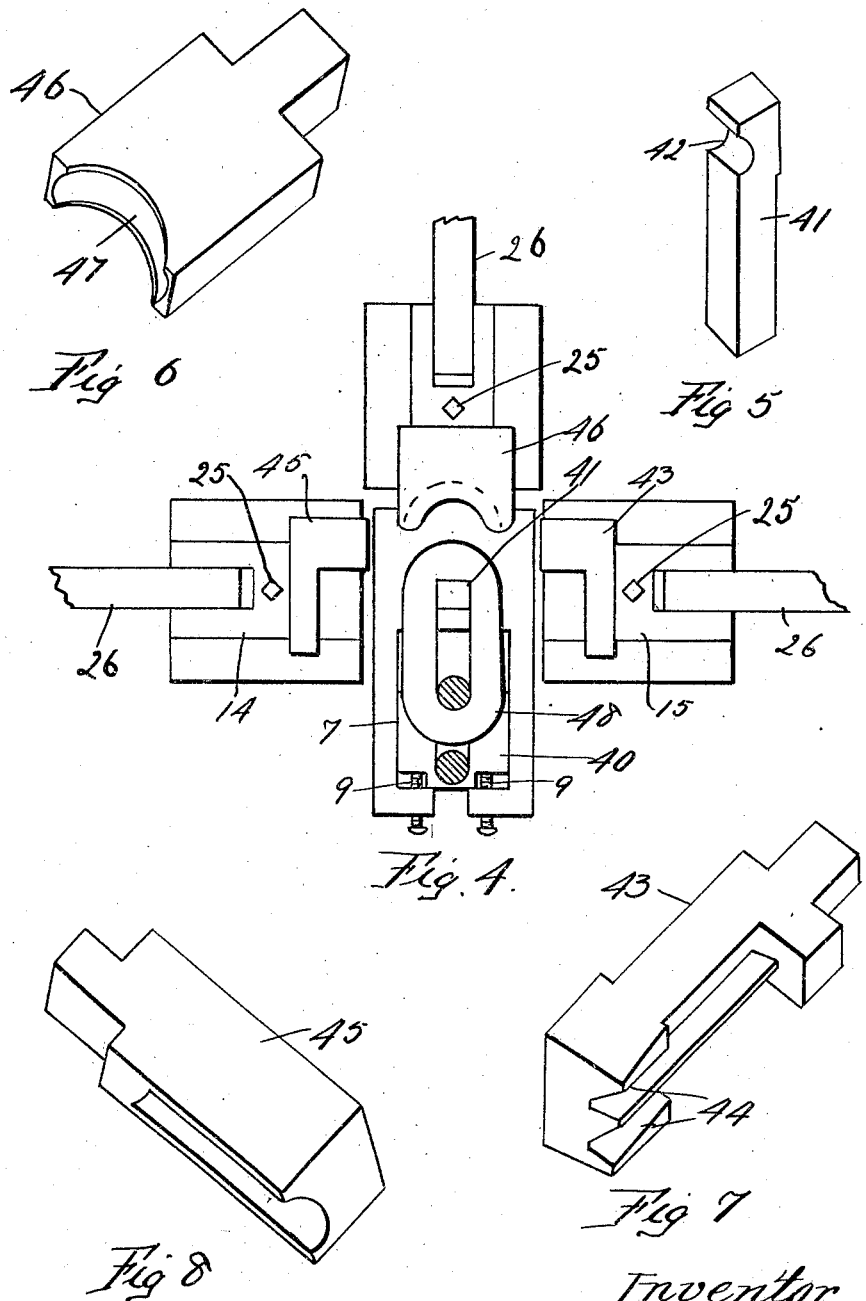

UNITED STATES PATENT OFFICE.

SAMUEL ROBINSON, OF FIELDSBORO, NEW JERSEY.

CHAIN-WELDING MACHINE.

1,362,897.  Specification of Letters Patent.  Patented Dec. 21, 1920.

Application filed January 29, 1919. Serial No. 273,800.

*To all whom it may concern:*

Be it known that I, SAMUEL ROBINSON, a citizen of the United States, residing at Fieldsboro, in the county of Burlington and State of New Jersey, have invented new and useful Improvements in Chain-Welding Machines, of which the following is a specification.

My invention relates to new and useful improvements in a chain welding machine, and has for its object to provide an exceedingly simple and effective device of this character whereby the links of a chain may be readily and quickly shaped and welded so as to produce a link, so that the same will be practically a continuous and integral piece.

A further object of the invention is to provide a machine of the character stated, the parts of which may be placed in operative positions by the actuation of suitable manually operated mechanisms, such as for instance, a treadle which may be actuated by the foot of an operator.

A further object of the invention is to provide a machine bed having an integral anvil holder and integral cross head slide blocks located about said anvil holder so that the cross heads may be actuated toward and away from said anvil holder, said cross heads each having a lever connected therewith, the outer ends of which are operated upon die cams revolving on suitable shafts whereby the cross heads may be actuated to work the dies for forming the links.

With these ends in view this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:

Fig. 2, is a side elevation thereof showing the levers in different positions with parts broken away to clearly illustrate the construction and having the lower part of the machine broken away, and Fig. 3, is a section of the machine bed on line 3—3, Fig. 1, with the operating parts removed.

Fig. 4, is an enlarged fragmentary plan view showing the thrust block, anvil and different dies in place.

Fig. 5, is a perspective view of the anvil used in producing elliptical links circular in cross section.

Fig. 6, is a similar view of the finishing die.

Fig. 7, is a similar view of the die used in the first operation.

Fig. 8, is a similar view of the die used in the second operation.

Figure 1:
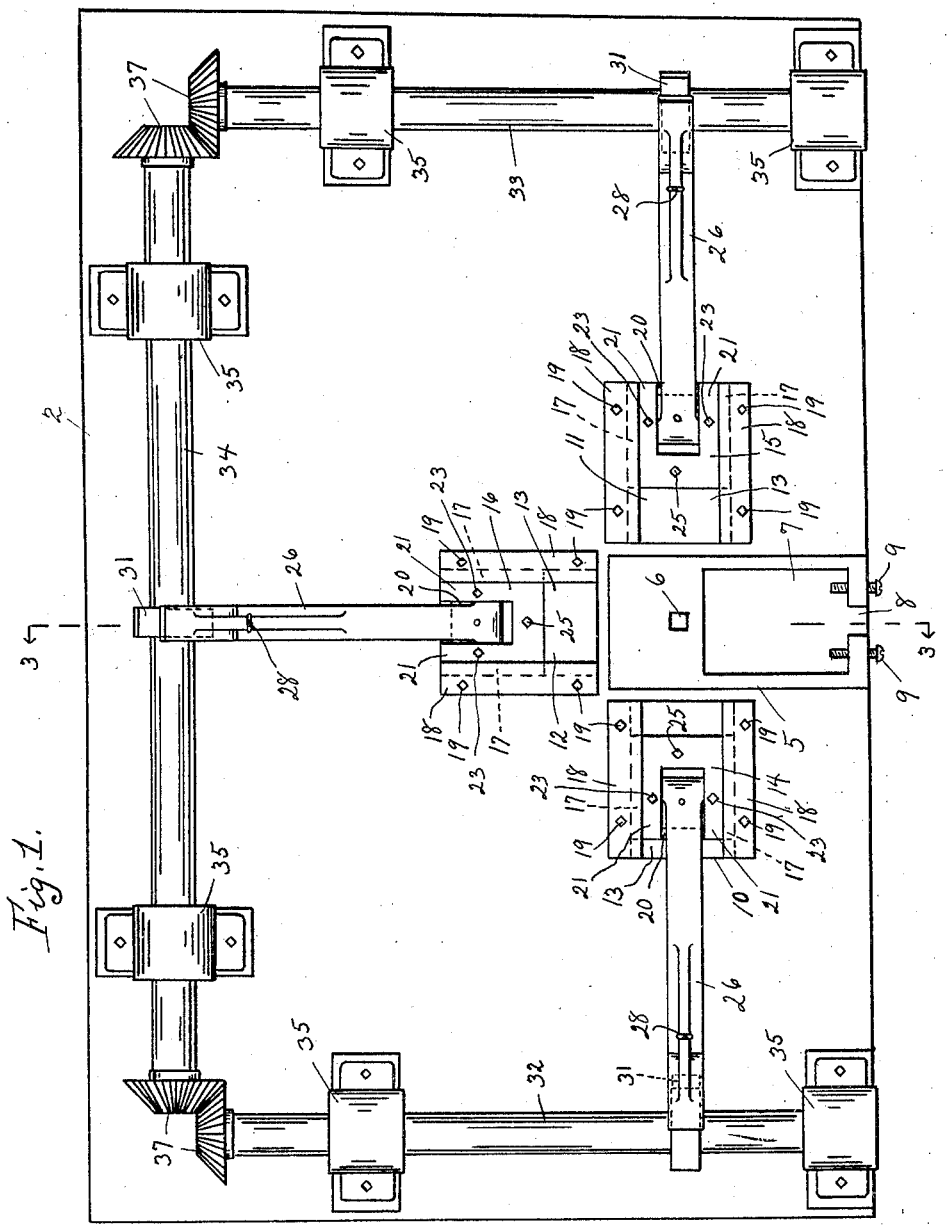
Figure 1, is a plan view of my improved link shaping and welding machine without the anvil and dies and without the weights for lifting the levers.

In carrying out my invention as here embodied 2 represents the machine bed having depending flanges or ledges 3 along two opposite edges and to these flanges are fastened suitable legs or standards 4.

Midway the length of the bed adjacent one of the longer edges thereof and projecting from the upper face is formed an integral anvil and thrust block holder 5 having a vertical hole 6 therethrough to receive the shank of a suitable anvil and also provided with a thrust block chamber 7 with which communicates a passageway or gate 8 and on each side of said passageway is located a set screw or bolt 9 whereby the thrust blocks may be adjusted according to the size of the links being formed.

Located about the anvil and thrust block holder are three cross head slide blocks 10, 11 and 12 all of which are equidistant from the hole 6 and these cross head slide blocks are formed integral with the machine bed 2 and project from its upper face and each has a slide groove 13 therein radial to said hole 6.

In these slide blocks are slidably mounted cross heads 14, 15 and 16 and as all of these are identical in construction only one of them will be described in detail and for convenience the one numbered 16 will be used as an example. The cross head has a pair of oppositely disposed flanges 17 over which are placed the plates 18 secured to the slide blocks by suitable bolts 19 or their equivalent and the main portion or body of the cross head projects above these plates and in its rear end is formed a chamber 20 thereby producing two parallel spaced side walls 21 in which are mounted the ends of the lever shaft 22, the same being held in position by suitable set screws 23. As the chamber 20 terminates short of the inner end of the cross head, a solid wall or face is provided and in this wall is formed a hole 24 for the reception of the shank of a suitable die, said die being held in place by a set screw 25 threaded through the cross head and into the hole 24 so as to engage the die shank.

The cross heads 14 and 15 carry shaping and swaging dies while the cross head 16 carries a welding or finishing die.

On the short shaft 22 of each cross head is mounted a lever 26 so that their outer ends may oscillate in a vertical direction and said outer ends are normally held in a raised position by suitable weights 27 attached to suitable cables 28 running over grooved pulleys 29 or their equivalent, said cables being attached to the different levers and said levers have arcuate or concaved bearing surfaces 30 at their outer ends with which under certain conditions contact suitable cams 31 mounted on the shafts 32, 33 and 34, the shafts 32 and 33 being located along the short sides of the machine bed while the shaft 34 is located only on the longer side of the bed.

The shafts 32, 33 and 34 are journaled in suitable bearings 35 secured to the pads 36 formed integral with the bed and projecting upwardly from the top face of said bed and said shafts are geared together in some suitable manner as by beveled gears 37 one of which is mounted on each end of the shaft 34 and one on each of the shafts 32 and 33 meshing with those on the shaft 34 so that power may be transmitted in any suitable manner to the shaft 34 and from it to the other shafts through the gears.

In order that the levers 26 may be moved into operative positions against the action of the weights 27 I connect to each lever a suitable operation pitman 38 which passes through a suitable hole 39 in the bed plate and these pitmen are connected with suitable operating levers or treadles whereby said levers may be readily actuated by the feet of an operator.

In practice a thrust block 40 is placed in the chamber cavity 7 and adjusted by set screws 9 with relation to an anvil 41 set in the hole 6, thereby determining the length of the link to be formed, and this anvil has an arcuate notch 42 into which the metal of the link blank is bent while the dies illustrated in Figs. 6, 7 and 8 are placed in the cross heads 16, 15 and 14 respectively. When a chain is being manufactured, a U shaped link blank which has been previously heated is placed in position so that the closed end rests upon and against the thrust block, while the free ends of the blank project beyond the anvil at each side thereof. As soon as the link blank is properly positioned the lever 26 carrying the cross head 15 is drawn outward into operative position against the action of its weight and held there until its coöperating cam has made a complete revolution and includes the arcuate bearing surface 30, thus forcing said lever with its cross head inward causing the die 43 to engage one of the free ends of the link blank and force it inward about the anvil and into the notch in said anvil, and at the same time the spaced ribs 44 of said die will cut into the metal and form grooves. After this operation has been completed the lever 26 carrying the cross head 14 is brought into operative position causing the die 45 carried by said cross head to engage the other free end of the link blank forcing the same over the bent portion of the other free end of the blank and cause some of said metal to be swaged into the grooves of the first bent end so as to be firmly welded together. After this second operation has taken place the lever 26 carrying the cross head 16 is moved into operative position so that the finishing die 46 carried by said cross head 16 will be moved into engagement with the partially finished link to complete the welding operation and to finish the closing in of the end of the link so that it will be symmetrical and smooth, said die having a groove 47 therein arcuate transversely to correspond to the shape of the link 48 and also arcuate in cross section vertically to correspond to the cross sectional shape of the material from which the link is being made.

As soon as each cross head is actuated by its cam, the pressure upon the lever is released thereby permitting the weights to draw the outer ends of said levers upward and as the cables fastened to said weights and levers pass over pulleys or wheels located beyond the outer ends of the levers, said levers will also be drawn outward thus moving the cross heads away from the anvil as will be obvious.

Of course I do not wish to be limited to the exact details of construction as herein shown as these may be varied within the limits of the appended claims without departing from the spirit of my invention.

Having thus fully described my invention what I claim as new and patentable is:—

1. A chain welding machine comprising a bed plate carrying an anvil and thrust block holder located intermediate two side edges and adjacent a third side edge, said holder having a hole therethrough for the reception of an anvil shank, cross head slide blocks located about said holder equidistant from the hole in said holder and on radial lines from said holder, cross heads slidably mounted in the slide blocks so as to move toward and away from the hole in the holder, said cross heads arranged to carry suitable dies, levers connected with said cross heads and arranged to oscillate in vertical directions, said levers having arcuate or concaved bearing surfaces at their outer ends, revolving cams adapted to force the levers with their cross heads inward when the bearing surfaces of said levers are moved into the path of travel of the cams, means for normally holding the levers in a raised position so that the bearing surfaces are out of the path of travel of the cams and means for moving said levers downward into the path of travel of said cams.

2. A chain welding machine comprising a bed plate carrying an anvil and thrust block holder located intermediate two side edges and adjacent a third side edge, said holder having a hole therethrough for the reception of an anvil shank, cross head slide blocks located about said holder equidistant from the hole in said holder and on radial lines from said holder, cross heads slidably mounted in the slide blocks so as to move toward and away from the hole in the holder, said cross heads arranged to carry suitable dies, levers connected with said cross heads and arranged to oscillate in vertical directions, said levers having arcuate or concaved bearing surfaces at their outer ends, journal boxes carried by the bed plate and located along three sides thereof, three shafts journaled in said boxes, beveled gears on said shafts for transmitting power from one to the others and causing them to revolve in unison, a cam on each shaft adapted to coact with the bearing surface of its respective lever, means for normally holding the outer ends of said levers in a raised position out of the path of travel of the cams and means for manually actuating said levers so as to draw them downward to bring the bearing surfaces into the path of travel of said cams, said means including pitman rods passing through the bed plate and connected with the different levers.

3. In a device of the character stated an oblong bed plate having holes therein, an anvil thrust block holder formed integral with said bed plate projecting from its upper face and located intermediate the length thereof adjacent one of the longer side edges, said holder having a vertical hole therethrough and provided with a thrust block chamber with a passageway leading to one end thereof, a set screw mounted in the outer end wall of the holder one on each side of the passageway whereby thrust blocks which are placed in the chamber of the holder may be adjusted relative to the hole for regulating the distance between said blocks and an anvil whose shank is located in said hole, cross head slide blocks formed integral with the bed plate and located about the holder equidistant from the hole in said holder and on radial lines from said hole, said cross head slide blocks having channels in their upper faces for the reception of cross heads and journal box pads formed integral with the bed plate projecting from the upper face thereof and located about three sides of the bed plate whereby journaled boxes may be attached thereto.

4. In a device of the character stated an oblong bed plate having holes therein, an anvil thrust block holder formed integral with said bed plate projecting from its upper face and located intermediate the length thereof adjacent one of the longer side edges, said holder having a vertical hole therethrough and provided with a thrust block chamber with a passageway leading to one end thereof, set screws mounted in the outer end wall of the holder one on each side of the passageway whereby thrust blocks which are placed in the chamber of the holder may be adjusted relative to the hole for regulating the distance between said blocks and an anvil whose shank is located in said hole, cross head slide blocks formed integral with the bed plate and located about the holder equidistant from the hole in said holder and on radial lines from said hole, said cross head slide blocks having channels in their upper faces for the reception of cross heads, journal box pads formed integral with the bed plate projecting from the upper face thereof and located about three sides of the bed plate, journal boxes mounted on said pads, shafts journaled in said boxes, beveled gears on said shafts whereby they will revolve in unison, a cam on each shaft in line with the different slide blocks and cross head slide blocks mounted in each of said slide blocks, each of said cross heads having a hole in its inner end for the reception of the shank of a suitable die, a set screw in each cross head for holding the die therein, each of said cross heads also having a chamber at the open rear end thereby producing parallel side walls, a shaft carried by each cross head having its ends mounted in the side walls and projecting across the chamber, set screws for holding the different shafts in place, a lever for each cross head journaled upon the short shaft carried by each cross head, each of said levers extending to a cam on one of the shafts and adapted to be oscillated in a vertical direction, each of said levers having an arcuate concaved bearing surface at its outer end, means for normally holding the outer ends of said levers in their raised positions out of the path of travel of the cams and in such positions that the cross heads may be drawn away from the holder and means for drawing the outer ends of said levers downward so as to bring the bearing surface into the path of travel of the cams whereby said cams may impart an inward motion to the levers for moving the cross heads toward the holder, said means including an element connected with each lever passing through the holes in the bed plate.

In testimony whereof I have hereunto affixed my signature.

SAMUEL ROBINSON.